United States Patent Office 2,891,027
Patented June 16, 1959

2,891,027
NON-ELECTROSTATIC MOLDING COMPOSITIONS CONTAINING HYDROXYALKYLATED ALKYLENE DIAMINES

Myron A. Coler, Scarsdale, and Arnold S. Louis, Riverdale, N.Y.

No Drawing. Application December 30, 1955
Serial No. 556,399

18 Claims. (Cl. 260—32.6)

This invention relates to improved synthetic resin molding compositions, and in particular, to such molding materials which avoid the highly undesirable effects of electrostatic charge build-up during the molding operation.

It has been found that the process of molding certain synthetic resins causes the generation of high electrostatic charges. This evidences itself frequently by the formation of "crow's-feet," "fern-like" and "zig-zag" patterns through the attraction of fine dust particles from the atmosphere. Such patterns are sometimes erroneously interpreted as being molding flaws.

The literature discloses many additives for rendering synthetic resins destaticized. Many of such additives depend on the property of deliquescence to cause the article to be wetted by moisture from the air. The moisture renders the surface of the article sufficiently conductive to prevent the further accumulation of electrostatic charges. Molding operations are normally carried out at temperatures substantially in excess of the boiling point of water, and therefore, as molded, the molded article is relatively moisture free and thus subject to the accumulation of electrostatic charges at the time of molding.

Still other additives which are inherently destaticizing agents tend to undesirably affect the physical properties of the plastic. For example, a lowering of the heat distortion point may occur, there may also be a change in color, gloss, hardness or water absorbtion characteristics or blemishes may result from decomposition of additives or evaporation of low boiling fractions. The resulting product may also become toxic if the additive is in itself toxic. Color is an important factor because a sizeable volume of the synthetic resins produced reaches the consumer in a clear or tinted transparent form. It may be appreciated that but few materials are so compatible with clear plastics such as polystyrene that they may be incorporated without affecting the clarity or color of the molded plastic.

Our invention, disclosed hereinafter provides a plastic composition which avoids the disadvantages of acquiring electrostatic charges and, in particular, which is not susceptible to electrostatic charging during the molding operation or upon release from the mold. This invention does not depend on deliquescent action and therefore produces results substantially independent of humidity. This advantage of this invention is important in the elimination of the tendency for dust patterns to form on freshly molded plastic articles.

We have found that when a particular group of additives, namely the totally hydroxyalkylated alkylene diamines wherein the hydroxyalkyl group contains from 2 to 8 carbon atoms and the alkylene group contains from 2 to 6 carbon atoms are incorporated into synthetic resin compositions, desired destaticizing properties are attained without incurring any of the undesirable features enumerated above.

A totally unexpected advantage of the above named additives was discovered during molding tests of material prepared in accordance with this invention. It was found that the additive improved flow properties of the base plastic so as to permit shorter molding cycles as well as improved filling of thin mold sections; reduced breakage of thin-walled moldings and easier mold release were obtained.

An object of this invention is therefore to provide a method for eliminating the formation of electrostatic charges on molded plastic articles.

Another object is to provide a plastic molding composition having improved molding properties.

Still another object is to provide a plastic molding composition having preferred flow properties when injection molded.

A particular object of this invention is to provide a method for eliminating the formation of electrostatic charges on molded plastic articles during the molding operation.

Another object is to provide articles comprising polystyrene compositions which are free of the effects of electrostatic charges.

Another object is to provide improved methods for making synthetic resin compositions suitable for molding articles free from the effects of electrostatic charges.

Still another object of this invention is to provide an improved plastic composition.

A still different object is to reduce the electrostatic charge on polystyrene objects made by injection molding.

A further object of this invention is to provide a polystyrene composition of superior molding properties.

Further objects and advantages will become apparent and still others will be pointed out with particularity as the following detailed description proceeds.

The totally hydroxyalkylated aklylene diamines wherein the hydroxyalkyl group contains from 2 to 8 carbon atoms and the alkylene group contains from 2 to 6 carbon atoms, may be incorporated into synthetic resin molding compositions to produce antistatic molding compositions.

The totally hydroxyalkylated alkylene diamines employed in the molding compositions of the present invention are represented by the following chemical structure;

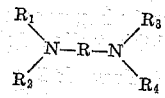

wherein: R is an alkylene radical containing from 2 to 6 carbon atoms and $R_1$, $R_2$, $R_3$ and $R_4$ is an hydroxyalkyl group with from 2 to 8 carbon atoms; in a given compound any of the several hydroxyalkyl groups represented by the symbol $R_1$, $R_2$, $R_3$ and $R_4$ may be alike or may be different.

In particular, we have found that totally hydroxypropylated ethylene diamine which has a high dielectric constant, is compatible with polystyrene which is but slightly polarized. That the materials are so compatible as not to destroy the clarity and transparency of the plastic is an interesting result in view of the difference in dielectric constants.

This particular compound is claimed in our co-pending application entitled Non-electrostatic Molding Compositions, Serial No. 532,131, filed September 2, 1955, and now abandoned.

The quantity of additive employed is between 1 and 7 percent by weight of the total product and preferably between 2 and 6 percent. The upper limit is a matter of choice dictated by considerations of economy and is not critical. For example, 10 percent or more may be used and the desired destaticizing results obtained, although at higher concentrations there is danger of affecting physical properties adversely.

In order to illustrate the invention specific examples are provided hereinafter. It is to be understood that they are not to be regarded as limiting in any way but merely illustrative.

Example 1

0.5 pound of totally hydroxypropylated ethylene diamine as supplied by Wyandotte Chemical Company under their trademark "Quadrol" was dissolved in 1 pound of isopropyl alcohol. 9.5 pounds of Monsanto Chemical Corporation, L2020 PIX-6, polystyrene granules having a particle size ranging from 10 to 60 mesh, were then thoroughly mixed with the solution. The alcohol was then evaporated in an exhaust oven at 65° C. for 36 hours with occasional agitation so as to leave the polystyrene granules uniformly coated with said additive.

The coated material was then fed through a Windsor type RC-65 twinscrew extruder equipped with a series of 1/8" square orifices. The die and barrel were maintained at 400° F. The extruded material was chopped up into molding granules.

Whereas the coated granules were sticky to the touch, the chopped granules were dry and free flowing and indistinguishable from untreated polystyrene molding chips.

The molding granules were injection molded on a Reed-Prentice 8 ounce injection molding press with a heater temperature of 600° F. The resulting articles were promptly sprayed with fine bentonite dust by means of a hand sprayer. The dust did not collect in patterns or charged areas. Additional moldings were set aside and observed periodically for several weeks. The absence of dust patterns was noted. Using a Keithley electrostatic voltmeter, a potential of less than one volt was measured between a molding and ground immediately after withdrawal from the mold.

As a control means, identical articles were molded from the same polystyrene not using the additive. One control article was sprayed with the bentonite dust immediately after molding and a well defined "fern-like" pattern was immediately apparent. The same control article yielded a 20 volt reading on the electrostatic voltmeter upon removal from the mold. After long term storage another unmodified polystyrene molding showed definite dust patterns whereas the modified polystyrene article showed but a few isolated gravity deposited grains.

The molding characteristics of the modified polystyrene was judged to be superior to that of the control or unmodified polystyrene by the molding machine operator on the basis of obviously improved ease of mold release and lower breakage of thin-walled moldings.

Example 2

The procedure of Example 1 was repeated with the exception that 0.1 gram of phthalocyanine blue was suspended in the alcohol and put through a colloid mill together with the additive prior to incorporation into the polystyrene. The resulting molded product was an attractive clear transparent blue color.

When tested as in Example 1 the molding and destaticizing characteristics were found to be identical to the treated product of Example 1.

Example 3

2.0 pounds of isopropyl alcohol and 0.3 pound of totally hydroxyoctylated ethylene diamine were mixed together to form a solution of watery consistency. The foregoing mixture was worked in a sigma blade mixer with 9.7 pounds of the same polystyrene as employed in Example 1. After 10 minutes the particles were found to be coated with the additive. The coated particles were then dried at 65° C. for 24 hours to remove the alcohol. The coated particles were then put through the extruder, chopped and molded as in Example 1. The resulting products showed substantially the same properties as the modified compositions of Example 1.

Example 4

0.6 pound of totally hydroxyethylated ethylene diamine and 9.4 pounds of polystyrene were thoroughly mixed in a sigma blade mixer. The mixture was then extruded, chopped and molded as in Example 1. The molded articles showed no discernable electrostatic charge as measured on the Keithley meter. The molded articles showed no tendency to collect dust in patterns during the storage test.

Example 5

Example 4 was repeated with an additive concentration of 1% by weight of the total. The resulting molding exhibited poor non-electrostatic properties, as measured by the Keithley voltmeter. A small amount of dust was collected in patterns after storage for two weeks.

Example 6

The procedure of Example 1 was repeated using totally hydroxyethylated hexamethylene diamine with an extruder die temperature of 375° F. utilizing polymethylmethacrylate as the resinous polymer. The resultant molding was cloudy and exhibited excellent antistatic properties. The voltmeter reading of a freshly molded article was 2.4 volts.

Example 7

The procedure of Example 4 was repeated with an extruder die temperature of 350° F. utilizing 1/8 inch polyethylene pellets as the resinous polymer and totally hydroxypropylated trimethylene diamine. The resultant molding had substantially the same appearance as an unmodified control molding and exhibited excellent non-static and molding properties. The Keithley voltmeter reading was 0.6 volt directly after the molding operation.

Example 8

The procedure of Example 1 was repeated using 0.6 pound of totally hydroxypropylated butylene diamine additive, 9.4 pounds of polyvinyl chloride and a die temperature of 390° F. The resulting molded articles were similar in appearance to unmodified polyvinylchloride and exhibited excellent molding and antistatic properties. The electrostatic voltmeter test yielded a reading of about 2 volts whereas untreated polyvinylchloride showed a reading of 20 volts upon molding.

Example 9

The procedure of Example 1 was repeated using 9.4 pounds of a so-called high impact polystyrene based composition which was a plastic alloy of 85% polystyrene, 5% polyacrylonitrile and 10% polybutadiene and 0.6 pound of totally hydroxyethylated butylene diamine.

The molded product was compared with a control specimen prepared in identical fashion with the exception that the additive was omitted. The two specimens were opaque in appearance. Immediately after molding the treated material showed a charge of 0.8 volt whereas the unmodified control showed a charge of 3 volts.

Of particular note was the retention of the highly desired toughness of the unmodified material.

Example 10

The modified polystyrene and unmodified polystyrene of Example 1 were tested to determine their relative flow properties. A Bakelite Flow Tester (Tinius Olsen Testing Machine Co.) was utilized as per ASTM D569-48. The procedure was to determine the flow in inches as recorded by the flow tester at 135° C. after an elapsed time of two minutes. A pressure of 500 p.s.i. was used.

The temperature was maintained at 135° C.±0.5° C. for each sample. Prior to testing, the samples were conditioned for 24 hours at 120° F. and allowed to cool in a dessicator for four hours.

The flow of the unmodified polystyrene was 0.92" average for two tests whereas the modified polystyrene showed an average flow of 1.31" for a two minute flow test.

Example 11

The procedure of Example 1 was repeated using 0.6 pound of totally hydroxyoctylated hexamethylene diamine and 9.4 pounds of polystyrene. The results were comparable.

Example 12

0.25% of α,α′ azodiisobutyronitrile was dissolved in 960 grams of monomeric styrene, 40 grams of totally hydroxypropylated ethylene diamine was dissolved in 100 grams of the styrene and set aside. 860 grams of the styrene was placed in a heated agitated reaction kettle into which nitrogen was bubbled. The styrene solution was heated at 70° C. for 1½ hours until an exothemic reaction took place. The reaction was continued for an additional 30 minutes with the temperature being gradually increased to 90° C. until considerable polymerization took place as evidenced by an increase in viscosity. The styrene-diamine was then mixed into the solution in the reaction kettle. The mixture was transferred to air free containers which were then sealed. The containers were maintained at a temperature of 90° C. for 48 hours. The resultant polymer was injection molded under normal polystyrene molding conditions. Moldings were clean and when rubbed with a wool cloth they would not become electrostatically charged as does unmodified polystyrene when so rubbed.

Example 13

40 grams of totally hydroxypropylated ethylene diamine dissolved in 40 grams of water, were incorporated into 666 grams of polystyrene emulsion containing 30% polystyrene solids.

760 grams of granulated polystyrene was placed in a Baker-Perkins mixer. With the mixer in operation, the polystyrene emulsion-diamine mixture was slowly added. The resultant slurry was then dried at 65° C. for 48 hours at which time it was found to be water free. The resultant mixture which contained 4% of the diamine, when molded as in Example 1, yielded transparent moldings which, when tested as in Example 1, exhibited destaticized characteristics similar to the modified properties of the product of Example 1.

Example 14

40 grams of totally hydroxyethylated propylene diamine, dissolved in 40 grams of water, was added to 400 grams of a 30% solids polystyrene emulsion. This mixture was spray-dried and gave a free flowing polystyrene powder containing 1 part of the diamine to 3 parts of polystyrene. The resultant concentrate was tumbled with 840 grams of a granulated polystyrene. The resultant blend was injection molded under conventional polystyrene molding conditions and yielded destaticized moldings.

Thus we have disclosed that by incorporating a minor proportion of totally hydroxyalkylated alkylene diamine in synthetic resins, many advantages are obtained such as improved molding properties and freedom from the formation of electrostatic charges.

For the purpose of illustrating the invention, examples have been shown of the application of our invention to plastic alloys of polystyrene, polyethylene, polyvinyl chloride and polymethylmethacrylate and their copolymers. We wish it to be understood that the invention likewise may be utilized in treating others such as polyamides, cellulose acetate, polyacrylonitrile, polyfluoroethylene, polytrifluoromonochloroethylene, polybutadienes, halogenated polystyrenes, and mixtures and copolymers of these materials.

The term "vinylidene" as used herein is intended to define monomers containing a polymerizable unsaturated

structure and is generic to vinyl and vinylidene monomers. Each of the polymers specifically exemplified in the preceding examples, namely: polystyrene, polymethylmethacrylate, polyvinyl chloride and polyethylene is a polymer of a vinylidene monomer, so defined.

By "plastic alloy" as used herein we intend to encompass compositions comprising two or more types of polymeric molecules whether prepared by copolymerization or simple intimate mixing.

Several examples have been given herein of suitable methods of incorporating the additive. The sole critical feature appears to be the requirement that the additive be uniformly dispersed. If a pigment is to be incorporated then the method of Example 2 is preferred. This method is claimed in our copending application entitled "Method of Formulating Plastic Compositions," filed September 2, 1955, Serial No. 532,132.

The procedure of Example 13 is of particular importance as it permits the separate shipping of a concentrate containing an additive which may be readily incorporated into a plastic molding composition by the molder by tumbling, mixing or extrusion.

It is within the scope of this invention to mix various herein specified totally hydroxyalkylated alkylene diamines and incorporate said resulting mixture within the range of 1% to 7% by weight of the total composition.

While we have disclosed what is at present considered the best mode for carrying out our invention we appreciate that it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A molding composition suitable for the production of molded articles characterized by the virtual absense of electrostatic charges on said articles, as molded, and consisting essentially of a linear polymer of a vinylidene monomer and from 1% to 7% by weight of said composition of a totally hydroxyalkylated alkylene diamine represented by the following chemical structure:

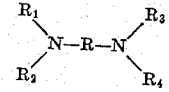

wherein $R_1$, $R_2$, $R_3$ and $R_4$ each represent a hydroxyalkyl radical containing from 2 to 8 carbon atoms and R is an alkylene radical containing from 2 to 6 carbon atoms, said diamine being dispersed throughout said composition.

2. The composition of claim 1 wherein said linear polymer is polystyrene.

3. The composition of claim 1 wherein said linear polymer is polyvinyl chloride.

4. The composition of claim 1 wherein said linear polymer is polymethyl methacrylate.

5. The composition of claim 1 wherein said linear polymer is polyethylene.

6. The composition of claim 1 wherein said linear polymer is a mixture consisting of the polymers of styrene, acrylonitrile, and butadiene.

7. The composition of claim 1 wherein said totally hydroxyalkylated alkylene diamine is totally hydroxyethylated ethylene diamine.

8. The composition of claim 1 wherein said totally hydroxyalkylated alkylene diamine is totally hydroxypropylated propylene diamine.

9. The composition of claim 1 wherein said totally hydroxyalkylated alkylene diamine is totally hydroxypropylated trimethylene diamine.

10. The composition of claim 1 wherein said totally hydroxyalkylated alkylene diamine is totally hydroxypropylated hexamethylene diamine.

11. The composition of claim 1 wherein said totally hydroxyalkylated alkylene diamine is totally hydroxyoctylated ethylene diamine.

12. The composition of claim 2 wherein said totally hydroxyalkylated alkylene diamine is totally hydroxyethylated ethylene diamine.

13. The composition of claim 2 wherein said totally hydroxyalkylated alkylene diamine is totally hydroxypropylated propylene diamine.

14. The composition of claim 2 wherein said totally hydroxyalkylated alkylene diamine is totally hydroxypropylated trimethylene diamine.

15. The composition of claim 2 wherein said totally hydroxyalkylated alkylene diamine is totally hydroxypropylated hexamethylene diamine.

16. The composition of claim 2 wherein said totally hydroxyalkylated alkylene diamine is totally hydroxyoctylated ethylene diamine.

17. An injection molded article molded from a composition of claim 1.

18. An injection molded polystyrene article molded from the composition of claim 12.

References Cited in the file of this patent

UNITED STATES PATENTS

| | | |
|---|---|---|
| 2,325,947 | Garvey | Aug. 3, 1943 |
| 2,403,960 | Stoops et al. | July 16, 1946 |
| 2,448,358 | Dangelmajor | Aug. 31, 1948 |
| 2,567,910 | Malone | Sept. 11, 1951 |
| 2,697,118 | Lundsted et al. | Dec. 14, 1954 |